Patented Mar. 9, 1948

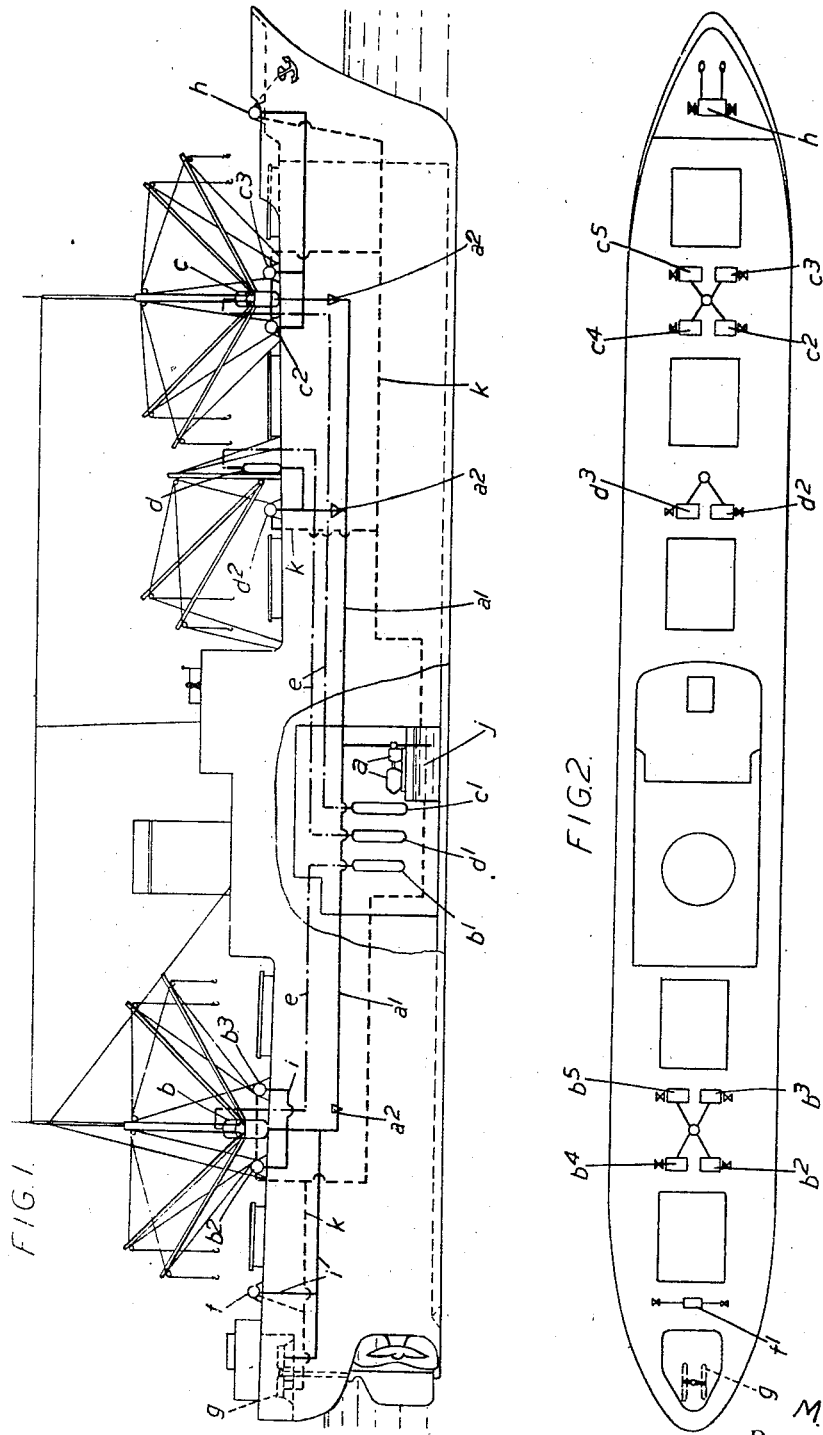

2,437,520

UNITED STATES PATENT OFFICE 2,437,520

HYDRAULIC PLANT

Maximiliaan Frederik Gunning,
Petersfield, England

Application February 22, 1945, Serial No. 579,198
In Great Britain February 2, 1944

4 Claims. (Cl. 60—51)

This invention relates to hydraulic plant for the operation of auxiliaries aboard cargo-carrying and passenger-carrying vessels, dredgers and other craft used for commercial and industrial purposes, such auxiliaries being cargo winches, lifts and hoists, slewing gear for cranes, steering gear and like apparatus which is liable to carry intermittent loads and also for the operation of similar mechanisms in hydraulic installations on land.

An hydraulic plant for these purposes consists at present of a pumping plant formed of one or more pumping units to supply the pressure liquid, and the motors or rams for driving the auxiliaries. Theoretically the pumping plant should have a capacity equal to the combined maximum capacities of all auxiliaries of the hydraulic plant, and in hydraulic plants where every auxiliary has its own pump this is actually the case. Where several auxiliaries are driven by one pumping plant usually only a percentage of this maximum capacity is provided, because the auxiliaries work intermittently, and not always simultaneously. The capacity of the pumping plant is thus determined by the maximum number of auxiliaries that may be expected to operate simultaneously at full load, plus any others that may be working under partial load, i. e., by the maximum load to which the system may be subjected. An accumulator, if fitted, has an auxiliary role, and serves to protect the system against sudden variations in pressure.

The disadvantages associated with such hydraulic plants are the size of the pumping apparatus necessary, and in motor driven vessels the corresponding increase in the electric installation, the large size of the high pressure hydraulic pipes running throughout the ship and frequently a low overall efficiency.

These disadvantages can be avoided by the present invention which is designed to reduce the consumption of pressure liquid and to permit a reduction in the size or capacity of the pumping plant.

According to the present invention an hydraulic plant for the purpose set forth comprises in combination one or more pumps of such capacity that when operating at full power, it, or they can maintain the supply of pressure liquid to deal with the average load, not the maximum load, with which the plant is designed to deal, one or more accumulators of such capacity that it, or they jointly, can supply the necessary pressure liquid during at least one complete cycle of operations of all the auxiliary mechanisms which, in practice, may operate simultaneously, and a number of multi-cylinder hydraulic motors arranged to drive some or all of the auxiliaries and supplied with pressure liquid by the accumulator or accumulators, the motor, or each motor or a number of the motors being such that the number of power strokes during each rotation and consequently the torque can be varied to meet prevailing requirements.

The invention further comprises a plant as set forth in the preceding paragraph which also supplies pressure liquid to auxiliaries not operated by multi-cylinder hydraulic motors of the kind specified, such as ram-operated steering gear.

With such improved plant the amount of pressure liquid used for any particular purpose, for example, in driving one or more winches, can be regulated in accordance with the energy required at any particular moment.

The invention will now be described with reference to the annexed drawings wherein—

Figure 1 illustrates diagrammatically a marine vessel having a hydraulic plant in accordance with the present invention, and Figure 2 is a plan thereof.

In the plant illustrated a pump $a$ supplies pressure liquid through pipe lines $a^1$ and non-return valves $a^2$ to three accumulators $b$, $c$ and $d$. To said accumulators are connected the air bottles $b^1$, $c^1$ and $d^1$ respectively, the connecting pipe lines $e$ being shown in chain-dotted lines.

Accumulator $b$ supplies pressure liquid to four multi-cylinder hydraulic motors which drive the four cargo winches $b^2$, $b^3$, $b^4$ and $b^5$. Further said accumulator supplies pressure fluid to a motor driving the warping winch $f$ and also to the hydraulic steering gear $g$.

Accumulator $c$ supplies pressure liquid to four multi-cylinder hydraulic motors which drive the four cargo winches $c^2$, $c^3$, $c^4$ and $c^5$. Further said accumulator supplies pressure liquid to a motor which operates the anchor winch $h$.

Accumulator $d$ supplies pressure liquid to a pair of multi-cylinder hydraulic motors which drive the two cargo winches $d^2$ and $d^3$.

The supply line connecting the accumulator to the motors and to the steering gear are indicated at $i$ and the return flow lines by which the liquid is returned to the sump $j$ are indicated by the regularly dotted lines $k$.

The pump $a$ is of such capacity that when working at full power it can maintain the supply of pressure liquid to deal with the average requirements of any combination of the said motors, steering gear and any other hydraulically operated auxiliary apparatus which, in practice, may operate simultaneously.

In handling cargo the maximum amount of cargo handled by a single winch may be taken as about 25 tons per hour. If such load of 25 tons is raised say 30 feet the work done by the winch is 750 foot tons per hour or on an average not one horsepower. Yet the winch much have a capacity of about 30 H. P. to raise the load within a short period of time. A pump supplying pressure liquid to an hydraulic motor driving such winch in accordance with the present invention, instead of having an output of 30 H. P. need in theory only have an output of less than 1 H. P.

Thus the pump $a$ need have just such capacity that when operating at full power it can supply the pressure liquid to deal with average load, not the maximum load, of the motors driving the winches $b^2$, $b^3$, $b^4$, $b^5$, $c^2$, $c^3$, $c^4$, $c^5$, $d^2$ and $d^3$.

As the steering gear and motors driving the warping winch and anchor winch will not be operated at the same time as the cargo handling winches and further, as a pump having the capacity necessary to meet the requirements of the cargo winches will be generally sufficient to operate the steering gear, warping winch and anchor winch, only the requirements of the cargo winches need be considered in deciding the required capacity of the pump.

The pumps may run either intermittently or continuously, but in the latter case a by-pass is provided with an automatic valve which will operate when the maximum pressure is attained in the system and the accumulators are full. Again the pumps may be of the variable delivery type when the delivery will be automatically determined by the pressure in the system and the pumps will run idly when the maximum pressure is reached. It is preferable, however, to use pumps of the intermittently running type since economy is then obtainable owing to the losses when idling being eliminated.

The accumulator $b$ must be of such capacity that it can supply the necessary pressure liquid to the four multi-cylinder motors driving the winches $b^2$, $b^3$, $b^4$ and $b^5$ when carrying maximum load for at least one complete cycle of operations.

A complete cycle of operations of a winch when operating singly consists in raising the load, lowering the load, raising the empty hook and finally lowering the hook to receive another load. In only one of such movements is any substantial work done by the winch.

When the cargo is handled by twin derricks the two hooks are attached to the load but the load is raised by one only, the second winch thereafter taking charge and lowering the load. When the load is deposited the two empty hooks are raised and thereafter lowered preparatory to receiving another load, this completing the cycle. Here again in only one of said movements is any substantial work done, and this work is done by only one of the twin derricks.

The accumulator $b$ will be able to supply the necessary pressure liquid to operate the warping winch $f$, which will not be operating simultaneously with the cargo winches. Further this accumulator will generally be able to supply the pressure liquid required to operate the steering gear $g$, which will not be operated simultaneously with the winches.

In like manner the capacity of the accumulator $c$ must be such that it can supply the necessary pressure liquid to the four multi-cylinder motors operating the winches $c^2$, $c^3$, $c^4$ and $c^5$, when carrying full load for at least one complete cycle.

When raising the anchor only the motor driving the raising and lowering gear or anchor winch $h$ will be supplied with pressure liquid and the pump $a$ running continuously will be able to maintain the necessary supply of pressure liquid.

The capacity of the accumulator $d$ must be such that it can supply the necessary pressure liquid to the two multi-cylinder motors operating the winches $d^2$ and $d^3$ when carrying full load for at least one cycle of operations.

The motors driving the warping winch $f$ and the anchor winch $h$ and the motors which operate the cargo winches are multi-cylinder hydraulic motors wherein the number of power strokes during each rotation can be varied to vary the torque to meet prevailing requirements. Such motors are set forth in my copending patent application Serial No. 579,197, filed February 22, 1945.

By the use of these motors the liquid supplied thereto by the accumulators is just that needed to give the torque necessary to meet the prevailing requirement at any moment with each cylinder in operation developing substantially its full power.

The following shows by way of example the contrast between the conditions in a plant of some known system and the improved hydraulic plant above described. In a plant such as commonly employed on shipboard there may be, say, 10 winches, each of them being of 20 H. P. and to supply and operate these in the usual way the pumping plant would be of the order of 140 H. P. and if an accumulator is fitted this would have a capacity of about 10 gallons which would be quite sufficient for such a plant. In a plant according to this invention which is to supply the same number of similar winches the capacity of the pumping plant need only be about 50 H. P. while the capacity of the accumulator or accumulators would be about 200 to 300 gallons.

The pipe lines between the pump and accumulators, between the accumulators and motors and between the motors and the sump may be of relatively small bore as contrasted with the pipe lines in other hydraulic systems in marine vessels.

What I claim as my invention and desire to secure by Letters Patent is:

1. A hydraulic plant comprising in combination a plurality of groups of power driven devices each having at least one power driven mechanism and at least one variable capacity hydraulic motor arranged to drive said mechanism, means by which the torque imparted to each motor can be varied by varying the amount of pressure liquid consumed per revolution by each motor, the pressure under which the liquid is supplied being maintained substantially constant, an accumulator for each such group having a capacity which will enable it to supply the necessary pressure liquid in adequate amount to each motor driving the mechanism of such group for at least one complete cycle of operation, and a pump having a capacity such that when operating at full power it can maintain the supply of pressure liquid to said accumulators sufficient for the average load but not sufficient for the maximum load with which the plant is designed to deal.

2. A hydraulic plant for operating power driven mechanism under load for short periods of time and under no load for other periods of time comprising at least one such mechanism driven by a variable capacity hydraulic motor, means for varying the torque imparted to said motor by varying the amount of pressure liquid consumed per revolution thereof, the pressure under which the liquid is supplied being maintained substantially constant, in combination with at least one accumulator of sufficient capacity to supply the necessary pressure liquid to each motor connected thereto during each said short period to the extent that and in so far as they operate simultaneously, and with a pumping plant having a capacity such that when operating under full power it can maintain the supply of pressure liquid to each accumulator sufficient for the average load but not sufficient for the maximum load for which the plant is designed.

3. A hydraulic plant comprising the features as set out in claim 2 having at least one mechanism actuated by a hydraulic cylinder device, supplied with pressure liquid from said pump and accumulator.

4. A hydraulic plant comprising the features as set out in claim 2 in which the variation in the torque imparted by each motor to the mechanism driven thereby is effected by rendering inoperative some of the cylinders of the motor while other cylinders are permitted to be fully operative.

MAXIMILIAAN FREDERIK GUNNING.

REFERENCES CITED

The following references are of record in the file of this patent:

UNITED STATES PATENTS

| Number | Name | Date |
|---|---|---|
| 1,229,076 | Hayes | June 5, 1917 |
| 1,711,967 | Robson | May 7, 1929 |
| 2,006,237 | Eynard | June 25, 1935 |
| 2,170,890 | Allen | Aug. 29, 1939 |
| 2,290,479 | Mercier | July 21, 1942 |
| 2,303,685 | Eden et al. | Dec. 1, 1942 |
| 2,355,357 | Adams | Aug. 8, 1944 |

FOREIGN PATENTS

| Number | Country | Date |
|---|---|---|
| 124,793 | Great Britain | Apr. 10, 1919 |